(12) United States Patent
Austin et al.

(10) Patent No.: US 7,908,652 B1
(45) Date of Patent: Mar. 15, 2011

(54) DETECTION OF OBSERVERS AND COUNTERMEASURES AGAINST OBSERVERS

(75) Inventors: David M. Austin, Alpine, UT (US); Wesley L. Austin, Bountiful, UT (US)

(73) Assignee: Trapware Corporation, Bountiful, UT (US)

( * ) Notice: Subject to any disclaimer, the term of this patent is extended or adjusted under 35 U.S.C. 154(b) by 1530 days.

(21) Appl. No.: 10/027,714

(22) Filed: Dec. 21, 2001

(51) Int. Cl.
*G06F 11/00* (2006.01)
*G06F 12/14* (2006.01)

(52) U.S. Cl. ............. 726/22; 713/188; 713/189; 726/23

(58) Field of Classification Search .................... 726/24, 726/22, 23; 713/187, 188, 189
See application file for complete search history.

(56) References Cited

U.S. PATENT DOCUMENTS

| | | | | |
|---|---|---|---|---|
| 5,696,822 | A | 12/1997 | Nachenberg | 380/4 |
| 5,832,513 | A | 11/1998 | Kennedy | 707/202 |
| 5,907,834 | A | 5/1999 | Kephart et al. | 706/20 |
| 5,964,889 | A | 10/1999 | Nachenberg | 714/25 |
| 5,978,917 | A | 11/1999 | Chi | 713/201 |
| 6,006,328 | A * | 12/1999 | Drake | 726/23 |
| 6,006,329 | A | 12/1999 | Chi | 713/200 |
| 6,021,510 | A * | 2/2000 | Nachenberg | 714/38 |
| 6,240,530 | B1 * | 5/2001 | Togawa | 714/38 |
| 6,289,448 | B1 * | 9/2001 | Marsland | 713/2 |
| 6,701,440 | B1 * | 3/2004 | Kim et al. | 726/24 |

FOREIGN PATENT DOCUMENTS

EP    0449242 A2 *   2/1991

OTHER PUBLICATIONS

Definition (Type), Dictionary.com, <URL1:http://dictionary.reference.com/search?q=type>, retrieved online Mar. 20, 2006.*

* cited by examiner

*Primary Examiner* — Christopher J Brown
(74) *Attorney, Agent, or Firm* — Austin Rapp & Hardman

(57) ABSTRACT

A system for detecting an observing program on a computer system is disclosed as including accessing instructions that access observer data that includes data descriptive of the observer program. The system also includes reading instructions that read memory of the computer system to obtain memory data. Further, the system includes comparing instructions that compare the observer data with memory data read in from memory to determine whether the observer program is present on the computer system. The system may also include generating instructions that generate results from the reading and comparing. The results generated indicate whether the observer program is present on the computer system. In addition, the system includes outputting instructions that obtain the results and provide the results for a user.

20 Claims, 10 Drawing Sheets

DETECTION OF OBSERVERS AND COUNTERMEASURES AGAINST OBSERVERS

RELATED APPLICATIONS

The present application is related to, and claims priority from, U.S. patent application Ser. No. 09/491,727, entitled "Detection of Observer Programs and Countermeasures Against Observer Programs," filed Jan. 27, 2000, which is hereby incorporated by reference in its entirety.

BACKGROUND

1. The Field of the Invention

This invention relates to computer software and, more particularly, to novel systems and methods for detecting the presence of computer hardware or software for monitoring a user's computer activities and countermeasures against such computer hardware or software.

2. The Background Art

Over the last number of years there has been an explosion with the use of computer technology. Many people now work with computers on a day-to-day basis, whether at work, at school or at home. Not only are computers used by people on a day to day basis, but also many people heavily rely on computers, computer software and computer technology to accomplish many tasks. With this heavy reliance and use of computers, it is not a surprise that a number of people spend many hours every day on a computer.

While on a computer, users can accomplish many tasks and can engage in a number of different activities. Some of these activities may be directly related to work-like tasks and activities relating to a person's job, activities, finances, business, etc. However, a number of activities that are accomplished on or with a computer are not related to work. There are a number of computer programs that do not relate to a person's job and are primarily for entertainment. For example, computer games can be used for relaxation and enjoyment, but they do not generally enhance a person's job performance.

With the explosion of computer technology has also come the information age and the Internet. The Internet allows a vast amount of information to be accessed and transferred; it allows many forms of communication and many services and activities are provided on the Internet. The World Wide Web portion of the Internet is particularly popular for browsing web sites containing information and services and activities.

With the growth of the information age, many computers, whether being used at a place of business or at home, now are capable of connecting to the Internet. With the ability to access the Internet, a computer user can do many things including the following: accessing all sorts of information, exchanging communications with other users, offering services and activities over the Internet, engaging in services and activities over the Internet, shopping using the Internet, etc. The various forms of activities that can take place over the Internet is increasing at a tremendous rate.

With the Internet and the many different kinds of computer software and services available, it is difficult to know what a computer user may be doing while on a computer. Some people may be concerned as to what kinds of activities are taking place on a computer or computers. For example, a manager of a business may want to know what his or her employees are doing on their computers, whether they are mainly working or whether they are playing games, surfing the Web, etc. Some parents may wish to know what their children are using their computers for. Various spouses may want to know what their spouse is doing on their computer. There are many contexts where a person, persons or entities may wish to observe or monitor activities taking place on a computer, with computer software, over the computer network, over the Internet, etc.

Software has been developed to meet the demands and needs of these persons and/or entities that wish to observe or monitor computer users in their activities. These software programs provide a wide variety of monitoring features. For example, some of these programs are able to log keystrokes of a user, log menu commands, take screen shots of a user's computer screen at various times, track use of various programs, track what web sites have been visited, monitor e-mail communications, etc. With the technology available today, most, if not all, of a computer user's activities on a computer can be observed and recorded.

Although these observer programs provide benefits to some, much of the time they are in use the computer user does not know and has no idea that much of what he or she does on the computer is being observed. For example, a user may be sending very personal and confidential e-mails to a family member, friend or companion. This unsuspecting user may have no idea that all of these personal communications are being logged and possibly read by others in his or her organization. A business consultant may be relaying confidential information about a company to its executives without knowing that the system administrator may be observing these communications. While on a lunch break or after hours a computer user may choose to visit certain web sites containing information of a confidential, personal and/or private nature. Using the observing programs now available, persons may be able to track what web sites are visited and even view screen shots of what was being viewed. Such abilities may be highly embarrassing to the unsuspecting computer user.

Unauthorized persons may use observing programs in an unlawful way or unauthorized way. For example, a coworker may simply wish to snoop on other people at work. Although not authorized by the company, this coworker may obtain an observing program and secretly install it on another's computer and configure it to monitor this computer's user and store the data in a way that this snooping coworker may have access to it. A corporation may be spied on by competitors using these observing programs. The potential damage to a corporation is great, depending on which computer user was targeted with the observing program. For example, if the observing program were installed on the right person's computer, valuable trade secrets, confidential information, marketing and business plans, etc. may be discovered and acquired by a snooping competitor.

With the computer technology of today and with the observing programs now available and for those programs that will surely be developed and used in the future, computer users may be watched by third parties more often than many think. It would be highly beneficial to computer users if they could find out whether they are being observed by computer software and technology and to know information about the observing activity and/or program. In addition, it would be beneficial to such users if they could counteract or combat the observing program.

BRIEF SUMMARY AND OBJECTS OF THE INVENTION

In view of the foregoing, it is an object of the present invention to provide systems and methods for detecting the presence of an observing or monitoring program.

It is also an object to provide countermeasures against observing or monitoring programs.

Consistent with the foregoing objects, and in accordance with the embodiments as embodied and broadly described herein, a system for detecting an observing program on a computer system is disclosed as including accessing instructions that access observer data. The observer data includes data descriptive of the observer program. The observer program is programmed to observe a user's activities on the computer system and also operates to create data from its observations. The system also includes reading instructions that read memory of the computer system to obtain memory data. Further, the system includes comparing instructions that compare the observer data with memory data read in from memory to determine whether the observer program is present on the computer system. The system also includes generating instructions that generate results from the reading and comparing. The results generated indicate whether the observer program is present on the computer system. In addition, the system includes outputting instructions that obtain the results and provide the results for a user. The outputting instructions may provide the results to a user through a graphical user interface.

The system may read the memory of the computer system by querying the operating system of the computer system for the tasks running and by examining task information provided by the operating system. In addition, the system may read the memory of the computer system by querying the file system of the computer system for the files located on storage media and by examining file information provided by the file system. In reading the memory, the system may also open a file located on storage media and examine the contents of the file.

The observer data may include data descriptive of a plurality of observer programs. When this is the case, the system compares the observer data with the memory data to determine whether any known observer program is present.

A method is disclosed for detecting an observing program on a computer system including the steps of accessing observer data, reading memory of the computer system to obtain memory data, comparing the observer data with memory data read in from memory to determine whether the observer program is present on the computer system, generating results from the reading and comparing, and outputting the results for a user.

Also disclosed herein is a system for altering the operation of an observer program on a computer system, wherein the system includes accessing instructions that access observer information that is descriptive of the observer program, reading instructions that read memory of the computer system to obtain files relating to the observer program, and altering instructions that alter a file relating to the observer program such that the operation of the observer program is changed. The system may also include inputting instructions that display to a user options regarding the altering and that take input from the user relating to the options.

The altering instructions may alter the operation of the observer program by altering observer program configuration data. In addition, they may alter the operation of the observer program by altering a file on the computer system. The altering instructions may also alter the operation of the observer program by altering reporting data generated by the observer program. Moreover, the altering instructions may alter the operation of the observer program by replacing reporting data generated by the observer program. A file of the observer program may also be replaced or changed to alter the operation of the observer program.

The systems disclosed may be made available over a computer network. For example, the Internet or the World Wide Web may be used in making the systems available to users. A web site may be used in providing the systems to users.

Instructions for detecting an observing program on a computer system and/or for altering the operation of an observer program may be contained on a computer-readable medium. The computer-readable medium may also be a data transmission medium.

BRIEF DESCRIPTION OF THE DRAWINGS

The foregoing and other objects and features of the embodiments will become more fully apparent from the following description and appended claims, taken in conjunction with the accompanying drawings. Understanding that these drawings depict only typical embodiments and are, therefore, not to be considered limiting of the invention's scope, the embodiments will be described with additional specificity and detail through use of the accompanying drawings in which:

DETAILED DESCRIPTION

Figure 1:
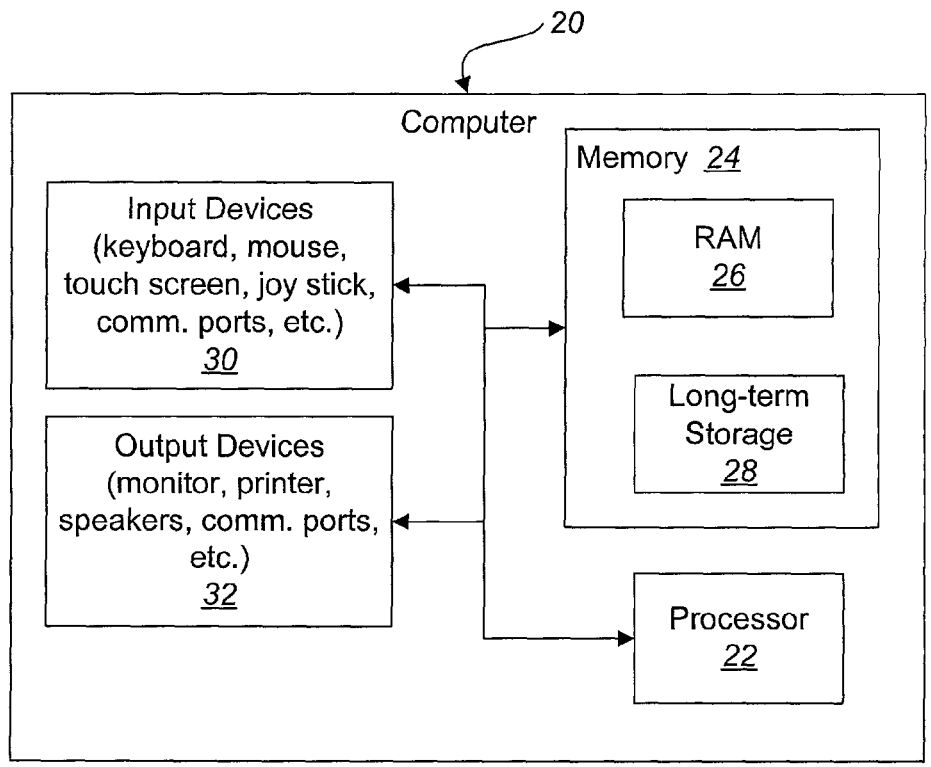
FIG. 1 is block diagram of the major hardware components of a computer used with the embodiments.

It will be readily understood that the components of the embodiments, as generally described and illustrated in the Figures herein, could be arranged and designed in a wide variety of different configurations. Thus, the following more detailed description of the embodiments of the systems and methods disclosed, as represented in FIGS. 1 through 13, is not intended to limit the scope of the invention, as claimed, but is merely representative of the presently preferred embodiments.

The presently preferred embodiments will be best understood by reference to the drawings, wherein like parts are designated by like numerals throughout.

Consistent with the foregoing objects, and in accordance with the embodiments as embodied and broadly described herein, a system for detecting an observing program on a computer system is disclosed as including accessing instructions that access observer data. The observer data includes data descriptive of the observer program. The observer program is programmed to observe a user's activities on the computer system and also operates to create data from its observations. The system also includes reading instructions that read memory of the computer system to obtain memory data. Further, the system includes comparing instructions that compare the observer data with memory data read in from memory to determine whether the observer program is present on the computer system. The system may also include generating instructions that generate results from the reading and comparing. The results generated indicate whether the observer program is present on the computer system. An observer program being present may mean any of the following: that it is installed, or that it has some portions of code running, or that it has some portions loaded into memory, or that it has a communications pathway open such that it has a virtual presence and can somehow monitor the computer, etc. As described, the term "present" is a broad term meaning any presence of or any connection to any portion of an observer program. This term shall not be narrowly construed as meaning only a certain type of installation or only a certain type of presence (e.g., only currently running as a task on the task list, or only current installed on the local hard drive, etc.).

In addition, the system includes outputting instructions that obtain the results and provide the results for a user. The outputting instructions may provide the results to a user through a graphical user interface.

The observer data that includes data descriptive of the observer program is a broadly defined term as any data that somehow describes one or more observer programs. As will be discussed hereinafter, this data may include a list of files, libraries, modules, tasks, etc. of one or more observer programs. In addition, this data may also include data that generally describes one or more observer programs without having any specific file, module, task, library, or the like information. For example, the data may include an indication of keystroke logging, or of menu command logging, or of periodic screen capture and the storing of the screen capture, etc. Thus, as illustrated, the observer data need not have information specifically tied into one or more observer programs, but may generally describe the characteristics of observer programs. In this way, embodiments herein may be implemented and used to detect observing programs whether known or unknown.

An instruction herein includes any and all types of instructions, including machine language instructions to be executed by a processor. Machine language is the native language of the computer. As will be appreciated by those skilled in the art, machine language instructions are created by programs called assemblers, compilers and interpreters, which convert the computer programming source code, typically written by a computer programmer or engineer, into the machine language that the computer understands. Thus, any reference to multiple instructions is not meant to limit the scope of the claims to many instructions written by a programmer, but only relates to the machine language instructions and recognizes that multiple machine language instructions will no doubt be needed to accomplish the more general function being referred to. Even a simple task such as moving data from memory to a register requires multiple instructions, such as moving the correct address into an address register and then moving the contents of that address into a certain data register. These low-level details are not necessary for those skilled in the art to implement the embodiments herein, but are only meant to explain the term instructions.

The system may read the memory of the computer system by querying the operating system of the computer system for the tasks running and by examining task information provided by the operating system. In addition, the system may read the memory of the computer system by querying the file system of the computer system for the files located on storage media and by examining file information provided by the file system. In reading the memory, the system may also open a file located on storage media and examine the contents of the file.

The observer data may include data descriptive of a plurality of observer programs. When this is the case, the system may compare the observer data with the memory data to determine whether any known observer program is present.

A method is disclosed for detecting an observing program on a computer system including the steps of accessing observer data, reading memory of the computer system to obtain memory data, comparing the observer data with memory data read in from memory to determine whether the observer program is present on the computer system, generating results from the reading and comparing, and outputting the results for a user.

Also disclosed herein is a system for altering the operation of an observer program on a computer system, wherein the system includes accessing instructions that access observer information that is descriptive of the observer program, reading instructions that read memory of the computer system to obtain files relating to the observer program, and altering instructions that alter a file relating to the observer program such that the operation of the observer program is changed. The system may also include inputting instructions that display to a user options regarding the altering and that take input from the user relating to the options.

The altering instructions may alter the operation of the observer program by altering observer program configuration data. In addition, they may alter the operation of the observer program by altering a file on the computer system. The altering instructions may also alter the operation of the observer program by altering reporting data generated by the observer program. Moreover, the altering instructions may alter the operation of the observer program by replacing reporting data generated by the observer program. A file of the observer program may also be replaced or changed to alter the operation of the observer program.

The systems disclosed may be made available over a computer network. For example, the Internet or the World Wide Web may be used in making the systems available to users. A web site may be used in providing the systems to users.

Instructions for detecting an observing program on a computer system and/or for altering the operation of an observer program may be contained on a computer-readable medium. The computer-readable medium may also be a data transmission medium.

Now referring to FIG. 1, FIG. 1 illustrates an embodiment of the major components of a computer 20 that may be used with the embodiments disclosed herein. Computers are well known in the art and are readily available for purchase. Many different kinds of computers can be used with the embodiments disclosed herein.

The computer 20 typically includes a processor 22 and memory 24 that includes non-volatile and volatile types of memory (e.g., RAM 26, a hard drive 28, etc.). It will be appreciated by those skilled in the art that various devices and/or components may be used for memory, including RAM, ROM, a hard drive, floppy drives, optical drives, etc. A computer 20 also typically includes input devices 30 (e.g., keyboard, mouse, keypad, switches, touch screens, etc.) and output devices 32 (e.g., monitors, printers, speakers, LCDs, etc.).

As discussed, many different kinds of computers can be used with the embodiments disclosed herein, including personal computers, workstations, personal digital assistants, cellular phones, web TVs, etc. The computers 20 herein are broadly defined digital computers. A computer, as used herein, is any device that includes a digital processor capable of receiving and processing data. A computer includes the broad range of digital computers including microcontrollers, hand-held computers, personal computers, servers, mainframes, supercomputers, and any variation, combination or related device thereof. The input and output devices 30, 32 include any component, element, mechanism, appliance, or the like capable of receiving and/or generating an electronic signal.

In current design, the embodiments herein are used with personal computers and workstations: the types of computers typically used by persons at work and at home on a daily and regular basis. It will be appreciated by those skilled in the art that the embodiments herein could be applied to many different kinds of computers as the needs arise for use of the embodiments with various and diverse computer systems.

Figure 2:
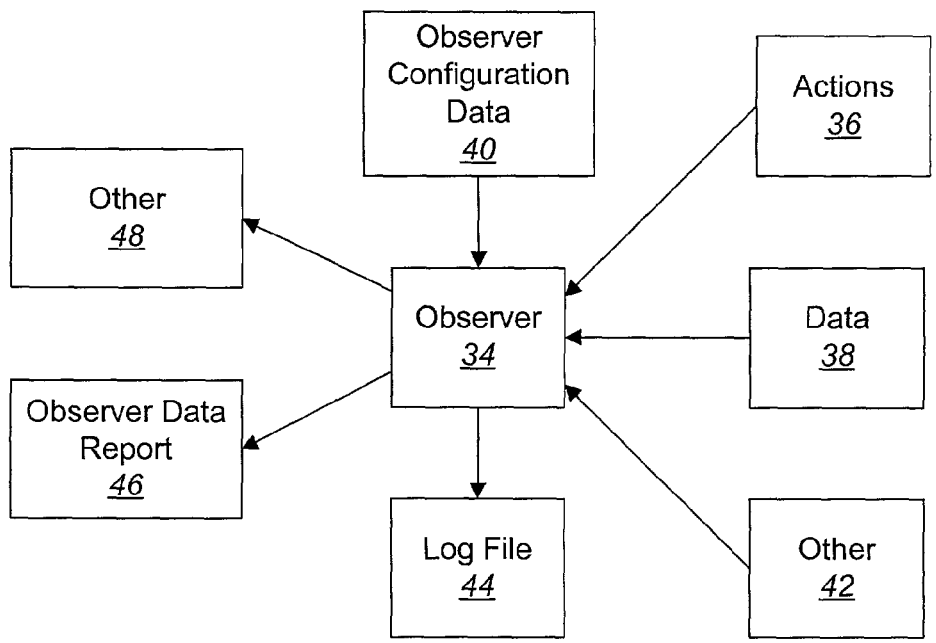
FIG. 2 is a data and software block diagram that illustrates the typical interactions and interfaces an observing or monitoring computer program has.

Referring now to FIG. 2, FIG. 2 is a data and software block diagram that illustrates the typical interactions and interfaces an observing or monitoring computer program 34 has. Observer programs, modules and functionality 34 are commercially available and/or can be created and employed by those skilled in the art. For example, one observer program now commercially available is the Investigator product offered by WinWhatWhere. Others include Omniquad Desktop Surveillance, WinGuardian, and Stealth Keyboard Interceptor.

An observer 34 is broadly defined herein as any tool, utility, computer software or computer technology used to observe, eavesdrop on, watch and/or otherwise monitor a computer user in his or her activities on a computer 20.

Typically observer programs 34 may receive or gather various input data and may create output data. As shown in FIG. 2, an observer may monitor and/or receive various actions 36 taking place on a computer 20. For example, actions 36 may include data transferal. Data transferal may be from input devices 30 such as a keyboard, a mouse or a microphone, or it may be from memory 24 devices such as RAM, internal storage (e.g., a hard drive), removable storage (e.g., CDs, floppies, removable hard drives), or from another external source, such as a network connection. Actions 36 may also include menu commands, process changes, file system changes, window creation and deletion, active window changes, an operation, a command, certain data or messages being received, etc.

Referring again to FIG. 2, an observer 34 may monitor and/or copy various pieces of data 38 available to a computer 20. For example, data 38 may include data stored on any type of memory (storage) device available to the computer 20, including but not limited to permanent storage (hard drive), removable storage (CDs, floppies, DVDs, removable hard drives), computer memory, data stored on a storage device made available via a network, etc.

Thus, observers 34 can be programmed and structured to observe or monitor virtually any detectable event or piece of data on the computer 20 or detectable by the computer 20.

An observer 34 can take user input or read in configuration data to configure itself. The configuration data 40 may configure the observer 34 to operate in a specific mode or modes. For example, if an observer 34 were to simply log keystrokes of a user and perform no more monitoring than that, observer configuration data 40 may be read in by the observer 34 that directs it to only log keystrokes. Configuration files and configuration data 40 are well known in the art.

Configuration data 40 may be stored in a variety of ways, depending upon the programmers, upon the computer, upon the operating system, etc. For example, if the observer 34 were installed to run on a typical personal computer running Windows 95/98/2000/ME/XP, the initialization or configuration data 40 may be stored as configuration files on the hard drive. Some initialization data may also be stored in certain ".ini" files, or in the registry. Those skilled in the art will appreciate the many ways that configuration data 40 can be stored for the various operating systems and computers that may be used.

Of course, other information and/or data 42 may be gathered by the observer 34. For example, file system changes (deletion, modification, creation), process changes (which process is the active process and for what period of time), data packets received over a network or communications port, data received from specialized input devices, etc.

Observers 34 may be programmed and/or configured to create and/or generate various sorts of data. For example, and as illustrated in FIG. 2, an observer 34 may create a log that logs all observed items. Some observers 34 may simply create a log file 44 and write data to the log file 44 to log every observed event, piece of data, etc. An observer 34 may write to a log file 44 every time new data is acquired and/or observed, or it may only periodically write to the log file 44 such newly acquired and/or observed data.

Observers 34 may be also programmed and/or configured to create and/or generate various sorts of reports. For example, and as illustrated in FIG. 2, an observer may create a report 46 for reporting the data that has been acquired and/or observed. Reports 46 may be stored locally on the computer 20, they 46 may be stored on or via a network connected to the computer 20, they 46 may be e-mailed to a certain e-mail address, etc.

Of course, other information and/or data 48 may be created by the observer 34, for example, an observer 34 may take screen shots of the computer's screen and e-mail them to a specified e-mail address. In addition, certain specified events may occur and cause the observer 34 to send a special message or data packet to a certain entity. For example, if an observer 34 monitors confidential documents being accessed or copied, an observer 34 may be programmed to immediately send an alert to a specified entity.

Figure 3:
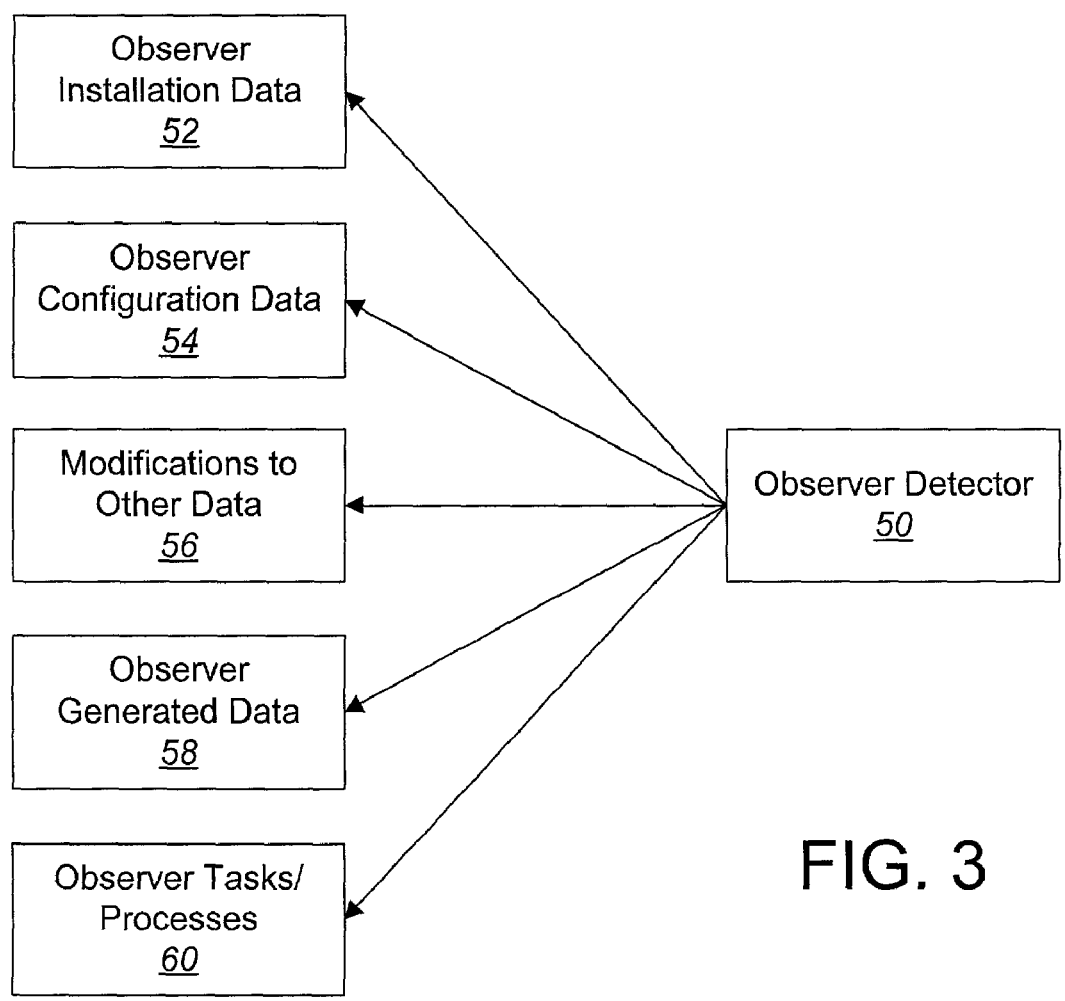
FIG. 3 is a software and data block diagram illustrating an embodiment of an observer detector and the software and/or data it may access.

FIG. 3 is a software and data block diagram illustrating an embodiment of an observer detector 50 and the software and/or data it may access. An embodiment 50 as illustrated in FIG. 3 may use the data used by an observer 34 and may use the data generated by an observer 34 to detect the presence of an observer 34. Embodiments herein may use many different methods to detect the presence of an observer 34.

When observer computer programs 34 are installed onto a computer 20, a number of files are copied to a storage device. Typically also one or more directories are created. The embodiment as shown in FIG. 3 may scan for this installation data 52 to see whether an observer 34 has been installed. For example, with an embodiment used with the Microsoft Windows 95/98/2000/ME/XP operating system, when installing an observer computer program 34, it may be that certain dynamically linked libraries ("DLL's") are installed to the Windows/System directory. In addition, typically a new directory is created for the observer 34 and a number of files and/or subdirectories are also created.

The embodiments herein may scan memory 24 for particular files 52, directories 52 and other items 52 created at installation of any observers 34 for the presence of one or more observers 34. Those skilled in the art will appreciate that these signs of installation can easily be obtained initially by simply downloading or buying an observer program 34 and installing it on a system 20. One skilled in the art may then compare the system 20 before the observer 34 installation with the system 20 after the observer 34 installation to see what new directories have been created, what new files are present, what files have been modified, etc. The comparison may be done quite simply, even a manual comparison may reveal many installation details. More rigorous comparisons may be made by using commercially available software to compare systems. For example, in a DOS shell one may use a DOS command, 'dir c: /s>dir.txt', to take a snapshot of the C drive and save the information in the file 'dir.txt'. After the installation of the observer 34 one may use the same command and save the snapshot in a different file. One may then simply compare the two files to see what changes have taken place during the installation of the observer 34.

One may also take snapshots of the registry to determine what changes have taken place during installation of an observer program 34. Those skilled in the art will appreciate that the program 'regedit' may be used to export the entire registry to a text file. The registry could be exported before and after observer 34 installation to determine what changes had taken place in the registry during observer 34 installation. One may then use one of the many programs that show the differences between files to see what changes have taken place. Microsoft's 'windiff' may be used to accomplish this. Many programmer editors will also accomplish this, such as, for example, the CodeWright editor. Thus, installation data 52 may be used to detect the presence of an observer 34.

Configuration data 54 used by an observer 34 may be used to detect the observer 34. The embodiments herein may scan memory 24, typically non-volatile memory for configuration data 54, which may be stored in particular files, directories, data structures, etc. Those skilled in the art will appreciate that configuration data 54 can easily be obtained initially by simply downloading or buying an observer program 34 and installing and configuring it on a system 20. One skilled in the art may then compare the system 20 before the observer 34 installation and configuration with the system 20 after the observer 34 installation and configuration to see what changes have taken place. The comparison may be accomplished as previously described. Examples of typical configuration data 54 locations when embodiments herein are implemented on a Windows 95/98/2000/ME/XP operating system include files on any long-term storage devices, INI files, the windows registry, etc. Thus, configuration data 54 may be used to detect the presence of an observer 34.

As illustrated and described herein, those skilled in the art will appreciate that modifications 56 to other data may have been made by any observers 34 or in connection with the operation, installation, modification, deletion, etc., of any observers 34. Accordingly, any other modifications 56 to the computer or modifications 56 detectable by the computer may be used to determine whether an observer 34 is present.

As described in relation to FIG. 2, observers 34 may generate data 58. For example, observers 34 may generate and/or modify log files 44, data reports 46, events, communications, etc. Embodiments herein may determine whether any observer generated data 58 is present or whether any observer generated data 58 has been created. Thus, observer generated data 58 may be used to detect whether an observer 34 is present.

When an observer computer program 34 is running, observer computer program instructions are typically loaded into memory 24 (typically RAM 26) and are being executed by the processor 22. Embodiments herein may query the operating system for any and/or all tasks 60 and/or processes 60 that are running. Embodiments may then determine whether the processes 60 and/or tasks 60 running are from an observer 34. Depending upon which operating system embodiments herein are implemented on, processes 60, tasks 60 and/or their equivalents may be detected in different ways. For example, in Windows NT, one may query the operating system for the processes 60 running through the EnumProcess( ) function call which currently resides in the file PSAPI.DLL. The operating system returns a list of the running processes 60. From this list one may query the OS about each process 60, such as asking what the module name is, or what files have been loaded by this process 60, etc. From this point, it is straightforward to compare the running processes 60 with the process characteristics of any observer programs 34. Of course, as disclosed above, one may install an observer 34 and run it to discover what processes 60 are running and their characteristics when the observer 34 is installed to observe. In addition, information may be published which indicates what processes 60 are running with each observer program 34. Other operating systems provide equivalent functionality to detect which processes 60, tasks 60 or equivalents are running. Thus, observer computer program tasks 60, processes 60 or equivalents may be used to detect whether an observer 34 is present.

To detect the presence of observers 34 that have not yet been characterized by one implementing embodiments herein, one skilled in the art may program an embodiment to examine any and all data on a computer system and then to catalog and/or identify it as belonging to known computer programs or to unknown computer programs. An embodiment may then report to the user any unknown software, data or configurations on or detectable by the system. To accomplish this, known computer programs would need to be characterized and cataloged. The characterizations of data would then be accessed by an embodiment to identify these known programs.

In addition, to detect the presence of observers 34 that have not yet been characterized by one implementing embodiments herein, one skilled in the art may program an embodiment to interrogate the operating system to determine what processes (or tasks) are doing things that an observer would typically do, such as logging keystrokes, monitoring internet activity, taking screen shots, etc. When this method is used, the observer data may include characteristics about one or more observer programs without knowing the specific files, modules, libraries, etc. of these one or more observer programs. For example, if this method were used, the observer data may include descriptions relating to any code that logs keystrokes, any code that logs menu commands, any code that periodically takes screens shots and stores or communicates them, etc. Using this observer data, an embodiment may then report to the user any processes or tasks that have been found to be doing the types of things that an observer would typically do.

Figure 4:
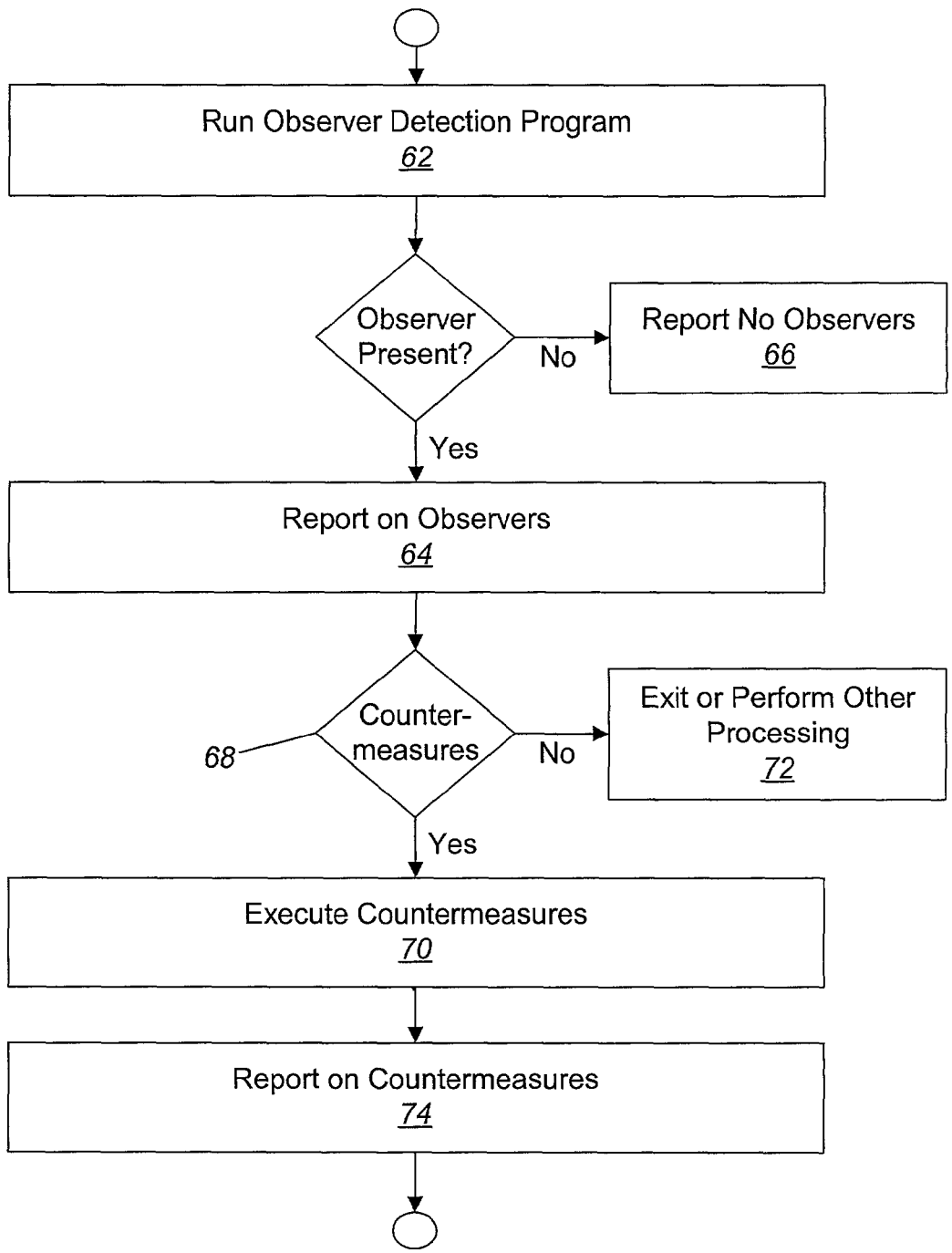
FIG. 4 illustrates a general flow diagram that includes steps that may be followed when using an embodiment.

FIG. 4 illustrates a general flow diagram that includes steps that may be followed when using embodiments as disclosed herein. A user may run 62 an observer detection program or observer detection code/instructions to detect whether an observer 34 is present. If an observer is present, embodiments herein may then generate 64 a report to the user reporting on the observer(s) detected. If no observer is present, embodiments report 66 to the user that no observers were present.

After observer detection means has run, a user may then be given a choice 68 as to whether he, she or it would like to run 70 any countermeasures. If the user does not wish to run 70 any countermeasures, the user may exit 72 the embodiments implemented. If the user wishes to run 70 countermeasures, embodiments herein may then execute 70 certain countermeasures. Embodiments of countermeasures will be illustrated below and discussed below.

After any countermeasures have been run 70, embodiments herein may then report 74 on the countermeasures, their operation, their success, etc. After reporting 74 on the countermeasures, a user may exit the embodiment. Of course, those skilled in the art will appreciate that changes could easily be made to the embodiments herein and still be within the scope of the teachings and claims of this patent. For example, embodiments herein may be implemented as a much larger computer program. As part of a much larger program, many different choices may be given to a user at different points as to what he, she or it would like to do. Thus, the embodiments herein may easily be modified to meet the needs of those skilled in the art implementing the claimed invention below.

Figure 5:
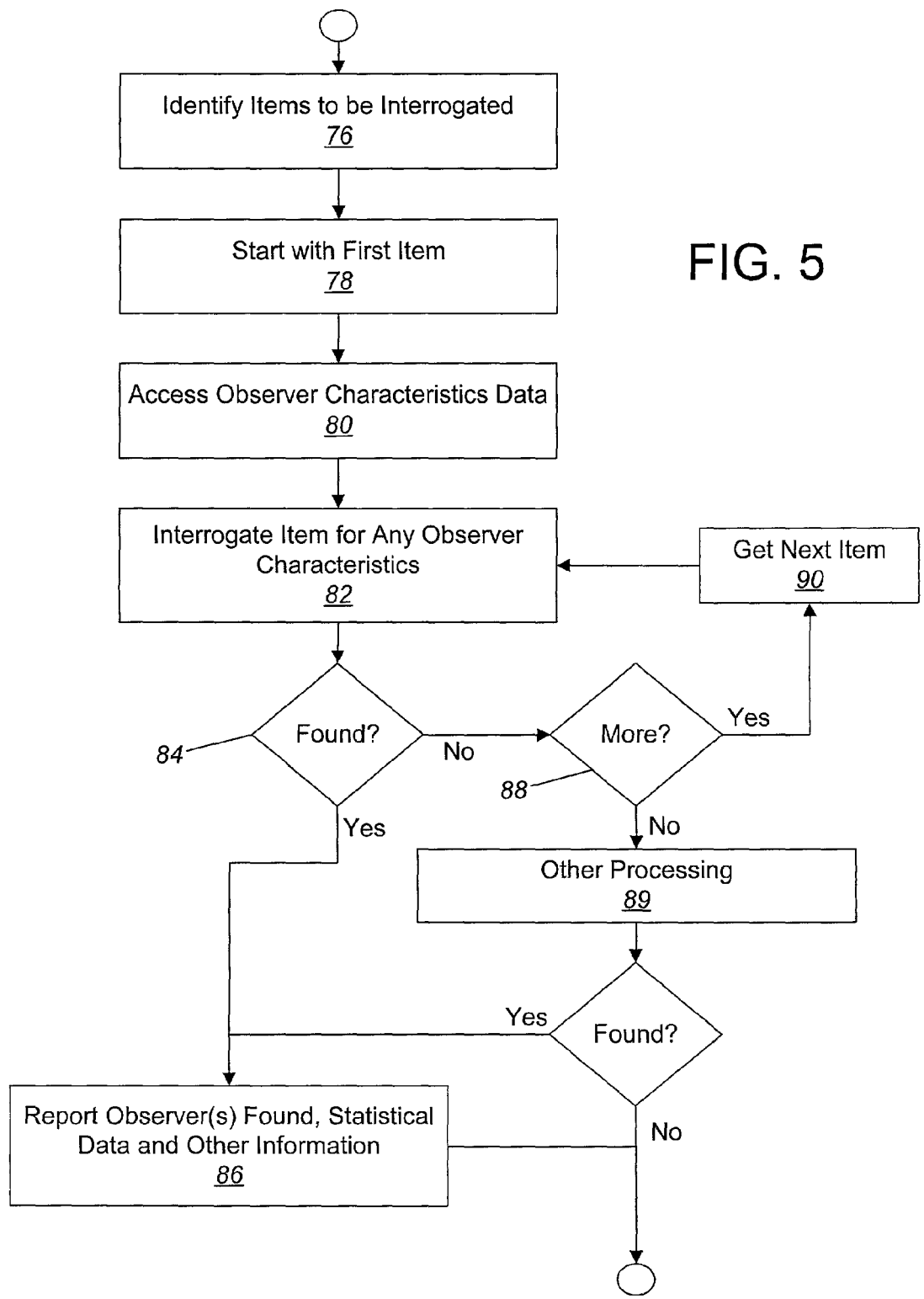
FIG. 5 illustrates a general flow diagram of steps that may be followed in implementing an embodiment of an observer detection computer program.

FIG. 5 illustrates steps that may be followed in implementing an embodiment of an observer detection computer program. Particular or specific items may be identified 76 to be interrogated in search for any observers 34 or signs of observers. In an embodiment a list of items may be created that identifies the items to interrogate. Most likely the list of items to be interrogated will depend upon the computer hardware and its operating system. Of course, the list of items to be interrogated may also depend on a number of factors. For example, the computer configuration may be a factor. If a particular computer 20 had several local hard drives, a number of network drives, a CD-ROM drive and memory, an observer detection embodiment may identify which of these memories it would interrogate first. In current design, the local hard drives are examined first, and then other memories are examined. After items have been identified 76 for interrogation by embodiments herein, the embodiment of FIG. 5 starts 78 with the first item and begins interrogation.

Once the list of items to interrogate has been identified 76, the embodiment shown in FIG. 5 may access 80 data containing characteristics of observer computer programs 34. This observer programs characteristics data may be stored in a separate file that can be accessed by the embodiment. In addition, the observer programs characteristics data may be stored on a computer network, whether a LAN, WAN, the Internet, etc., and may be accessible by the embodiment. The observer programs characteristics data may also be hard-coded into the code of the embodiment such that the embodiment simply need access one or more data structures to access the data. A combination of these methods may also be used to access the observer programs characteristics data. Those skilled in the art will appreciate the many ways that the observer programs characteristics data can be stored and accessed.

The embodiments use the characteristics data to identify what characteristics, items, modifications or things to look for to detect whether observer computer programs 34 are present. Once the characteristic data is available and can be accessed, the embodiment interrogates 82 the item for any of these characteristics. For example, if during installation of an observer computer program 34 a particular directory is created and particular files are copied to directories, the embodiment of FIG. 5 may interrogate the memory 24 for this particular directory and/or these particular files. As discussed herein, in scanning items, many different pieces of data and/or information can be accessed and examined in searching for any observer computer programs 34.

The embodiment of FIG. 5 may determine 84 whether any observer computer programs 34 are present. If one or more observer computer programs 34 are detected, the embodiment in FIG. 5 may report 86 such a finding. In addition, other data may also be generated and presented as part of the observer report. Those skilled in the art will appreciate that many different kinds of data may be displayed and reported to a user once one or more observers 34 have been found. For example, the type(s) of monitoring taking place (e.g., keystroke logging, menu commands, screen shots, etc.), how long the observer has been installed, where or to what are any reports being sent, etc., may be reported to the user.

If no observers are found, the embodiment of FIG. 5 may determine 88 whether more processing needs to be done. If more processing needs to be done, the embodiment may get 90 the next item in the list, or it may transfer control to other code to accomplish any other desired tasks. For example, if only one item has been interrogated, the embodiment of FIG. 5 may then cycle back to interrogate 82 the next item. If the list of items to be interrogated becomes exhausted before an observer is found, the embodiment may then perform other processing 89 to determine if an observer is present. For example, with some operating systems it may be possible to determine what processes (or tasks) are doing things that an observer would typically do, such as logging keystrokes, monitoring internet activity, taking screen shots, etc. When all processing is complete, then the embodiment in FIG. 5 may exit 92 from the steps shown.

Figure 6:
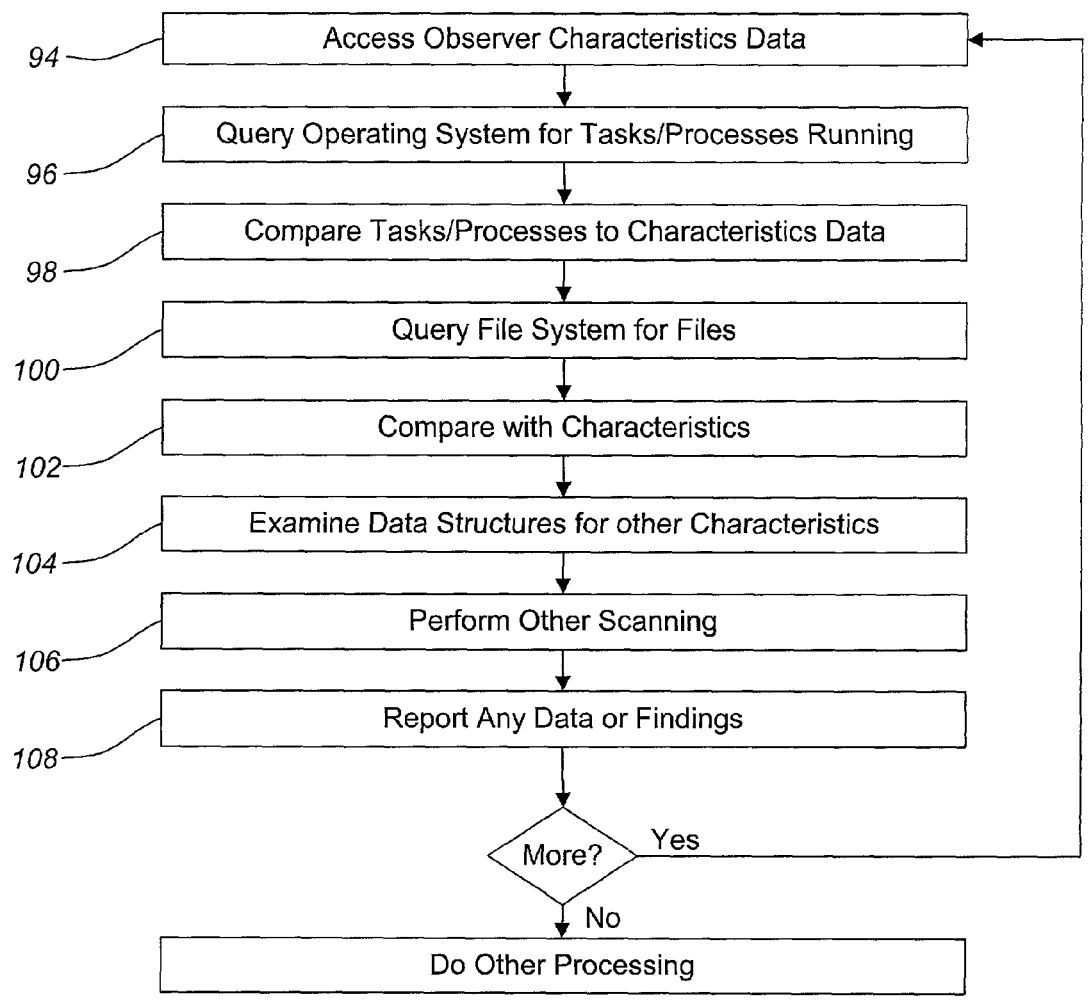
FIG. 6 illustrates a general flow diagram of steps that may be followed in implementing an embodiment of an observer detection computer program.

FIG. 6 illustrates steps that may be followed in implementing an embodiment of an observer detection computer program. The embodiment shown in FIG. 6 may access 94 data containing characteristics of observer computer programs 34. In using this data, as described herein, the embodiment can identify what items to look for in order to detect whether observer computer programs 34 are present. Once the characteristic data is available and can be accessed, the embodiment may begin to scan or examine the computer 20 for any of the characteristics. An observer program would be considered to be present if it was installed, or if it was up and running, or if any parts of the observer were installed, or if any parts of the observer were up and running, or if any part of an observer was in electronic communication with the computer such that any monitoring could take place.

The embodiment of FIG. 6 may query 96 the operating system for the tasks and/or processes running. Those skilled in the art will appreciate how this may be done. For example, with the Window NT operating system, the 'EnumProcess( )' function may be used to query 96 the operating system for running processes. Other equivalent function calls exist with other operating systems to query the operating system for running processes. Those skilled in the art with Linux, UNIX, the Macintosh operating system, JAVA, etc., will appreciate the function calls that may be used to accomplish this query.

Once the tasks have been identified that are running, the embodiment of FIG. 6 compares 98 these running tasks with the characteristics data to determine whether any of the running tasks belongs to an observer computer program 34.

The embodiment of FIG. 6 may query 100 the file system for directories and files accessible. Those skilled in the art will appreciate how this may be done. For example, with the Windows NT operating system, the 'FindFirstFileEx( )' function used in conjunction with the 'FindNextFile( )' function may be used to query 100 the file system for directories and/or files. As mentioned above, other operating systems and programs provide functionality sufficient to accomplish this query 100, and those skilled in the art will appreciate how this query 100 may be accomplished on the various operating systems.

Once the directories, files and any other file system data has been queried 100 and/or obtained, the embodiment of FIG. 6 compares 102 this data with the characteristics data to determine whether any of the directories, files, or other file system information belongs to an observer computer program 34.

The embodiment of FIG. 6 may also examine 104 any other data structures or information accessible and then compare this information with the observers characteristics. For example, if the observer computer program 34 has added its own hooks into the operating system, the embodiment of FIG. 6 may examine the operating system structure and files to determine if these hooks are present.

Depending upon the computer configuration, the embodiment of FIG. 6 may also perform 106 other scanning for any observer programs 34 or signs thereof. Those skilled in the art will appreciate how to access additional information or data when additional components, software or hardware, are added to a typical computer configuration.

If observer computer program characteristics are found, the embodiment of FIG. 6 may report 108 its finding to the user. Once any data has been reported, the embodiment of FIG. 6 may continue on, or it may exit. For example, the embodiment of FIG. 6 may be programmed to only read in one set of characteristic data at a time. That is, it may only read in the characteristics of one particular observer computer program 34 at a time. If this mode of operation is followed, once it has reported any findings of that observer computer program 34, the embodiment of FIG. 6 may cycle back up to read in the next set of characteristic data to check for the presence or signs of the next observer computer program 34. Of course, it will be appreciated by those skilled in the art that the embodiment of FIG. 6 may be programmed to read in and/or compare any acquired data with all the characteristic data sets at a time, rather than simply comparing with only one set of characteristic data.

When all observer characteristic data has been accessed, other processing may still be accomplished. For example, if no known observers were found then methods may be used to determine if an unknown observer may be present, such as interrogating the operating system to determine what processes (or tasks) are doing things that an observer would typically do, such as logging keystrokes, monitoring Internet activity, taking screen shots, etc.

A data structure may be used to store the observer program characteristics that are used to determine if an observer program is present. As discussed herein, the characteristics may include a number of different kinds of information. An observer program detector may identify one or more programs, files or modules that are to be scanned and compared with the observer program characteristics. There are many ways in which programs, files or modules may be identified. For example, all modules started at startup by a startup command may be a group and may be searched. In addition, all modules currently loaded into memory may be a group and may be searched. All modules on the local storage device(s) may be a group and may be searched. All modules in certain directories may be a group and may be searched. All modules in a certain directory that are loaded into memory may be a group and may be searched. As described, those skilled in the art may identify many groups and then search or scan these groups for any observer program characteristics.

On some computer systems, it may be faster to obtain the first item in a group and then compare it with all the observer program characteristics. Then the next item in the group may be compared with all the observer program characteristics, and so on. Of course, it will be appreciated that one may also scan all the items in a group for a particular observer program characteristic and then cycle to the next program characteristic.

Figure 7:
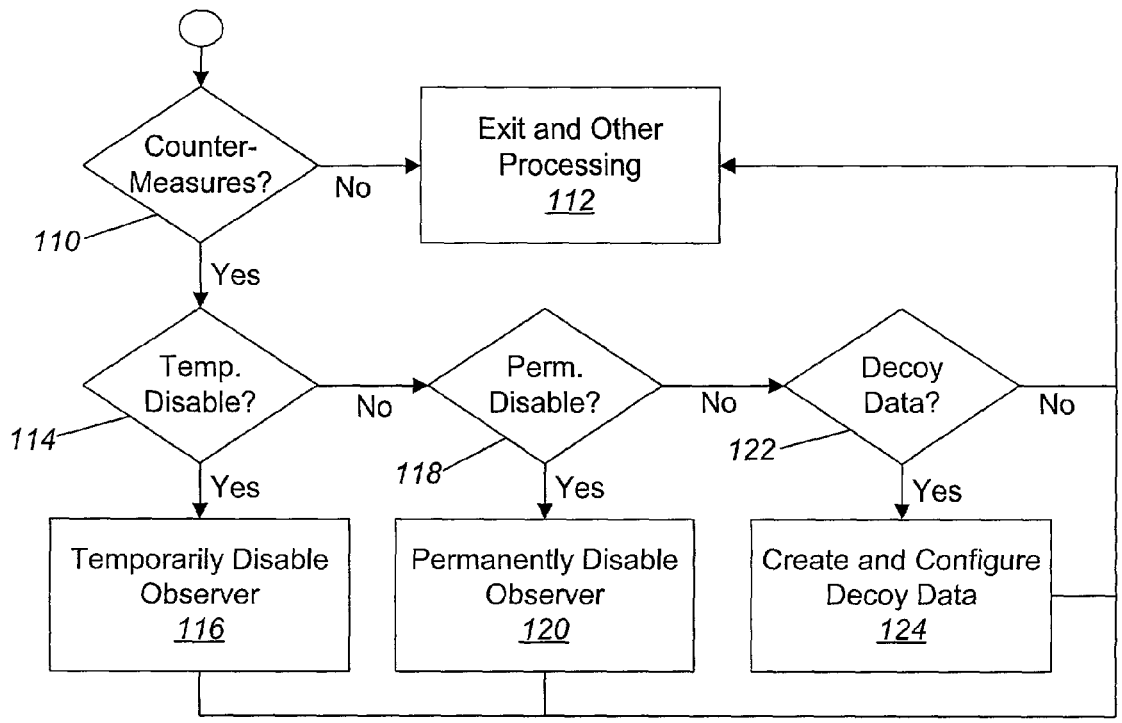
FIG. 7 illustrates a general flow diagram of steps that may be followed in implementing an embodiment executing countermeasures against observer computer programs.

As discussed previously, countermeasures may be executed once any observers have been detected. An embodiment shown in FIG. 7 illustrates the steps that may be followed in executing countermeasures. A user may be prompted 110 as to whether countermeasures should be executed. If the user wishes to execute countermeasures against the observer program 34, the embodiment may continue and ask the user for further inputs. If the user does not wish to execute countermeasures, the embodiment may simply exit 112, or perform other processing, depending on the particular implementation of the embodiment.

A user may be prompted and asked 114 whether he, she or it would like to simply temporarily disable the observer. If the user responds that he, she or it would like to temporarily disable the observer, the embodiment may temporarily disable 116 the observer program 34. Various means may be employed by the embodiment to accomplish the request. For example, the embodiment may simply kill or terminate any observer running tasks or processes. In addition, to temporarily disable 116 the observer 34, the embodiment may modify the observer's configuration data. In addition, to temporarily disable 116 the observer, the embodiment may detect the method that the observer 34 is using to automatically start and make modifications so the observer 34 will no longer automatically start. A number of other means may be used to temporarily disable 116 the observer, as will be appreciated by those skilled in the art.

If the user does not wish to temporarily disable the observer, the user may be given 118 the option to permanently disable 120 the observer. To permanently disable 120 the observer, the embodiment of FIG. 7 may uninstall the observer 34. In addition, the embodiment may delete essential files or executables so that the observer 34 cannot run. In addition, to permanently disable 120 the observer, the embodiment may remove configuration data essential for the observer 34 to run. A number of other means may be used to permanently disable 120 the observer, as will be appreciated by those skilled in the art.

To disable the observer, the observer program detector may remove any startup commands that caused the observer program to be started so that the observer program will not start again. Some observer programs may be harder to disable or kill than others. An observer program may be configured to not allow the process to be terminated and/or it may be configured to replace any deleted startup commands. With such an observer program, the observer program detector may configure the system to start the observer program detector's kill or disable functionality before the observer program is started. Thus, after a reboot or system reset and before the observer program has been started, the observer program detector may remove the startup command(s) that caused the observer to be started. In addition, the observer program detector may delete files and directories associated with the observer program so that it may not be easily reinstalled. As a result, the observer will not be started. Those skilled in the art will appreciate how one may cause a module, program or process to be started before the loading of other certain modules, programs or processes.

The observer program detector may include instructions to disable an observer program that is found on a computer system. In operation, the disabling instructions may function to enter a startup command to load a kill program before the observer program is started. Startup commands may be inserted in a variety of places, as known by those skilled in the art and/or as described herein (e.g., the registry, login scripts, startup files, etc.). The kill program may be a program that simply operates to delete the observer program's startup command or commands. In some cases, this may be accomplished by simply deleting an entry in the registry. In other cases, more commands may need to be deleted or modified. The disabling instructions may further operate to reboot or restart the computer. When the computer starts or reboots, it will process the kill program startup command and start the kill program. The kill program may then delete the observer program startup command(s) so that the observer program is not started. In addition, the kill program may delete files, directories and/or other data associated with the observer program.

The user may also be given 122 the option of creating 124 decoy or bogus observer created data. Depending on the particular observer 34 and/or the computer on which it is being used, various means may be used to create 124 decoy or bogus observer created data. For example, if an observer computer program 34 was configured to log all observed items to a log file 44, the embodiment of FIG. 7 may simply replace the log file 44 with a bogus log file before the log file is sent to another location or before it is retrieved by something or someone. If the observer computer program 34 was configured to e-mail observed items periodically to a certain e-mail address, the embodiment of FIG. 7 may disable the observer's 34 ability to e-mail its observed data and the embodiment may then, itself, e-mail off bogus or decoy data to the particular e-mail address at expected intervals. In addition, to create 124 decoy or bogus observer data, the embodiment may present the data to the user to be modified before being stored and/or e-mailed. The embodiment may also employ rules to modify the data before being stored and/or emailed. Those skilled in the art will appreciate the many ways that decoy or bogus observer data may be created and the many ways in which the decoy or bogus data may be substituted for the original observer created data.

Figure 8:
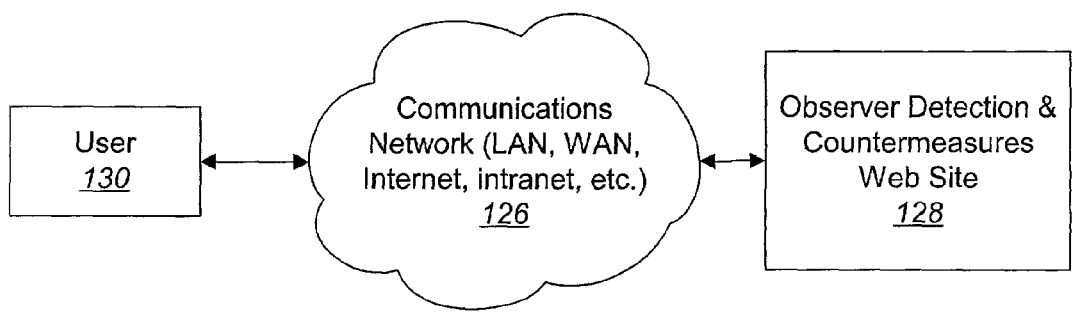
FIG. 8 illustrates a general block diagram of a computer network being used to distribute and use embodiments as disclosed herein.

With the popularity and usefulness of computer networks, including the Internet and the World Wide Web, a computer network 126 may be used to supply and use embodiments as disclosed herein. FIG. 8 illustrates a general block diagram of a computer network 126 being used to distribute and use embodiments as disclosed herein. Embodiments shown herein may be implemented and used over computer networks 126, including, for example, the Internet and the World Wide Web, a corporate intranet, a LAN, a WAN, etc. For example, a web site 128 may be implemented that allows users 130 browsing the Web to access and use observer detection computer programs and countermeasures to check their local systems. The steps that may be followed in such an implementation are illustrated in FIG. 9.

Figure 9:
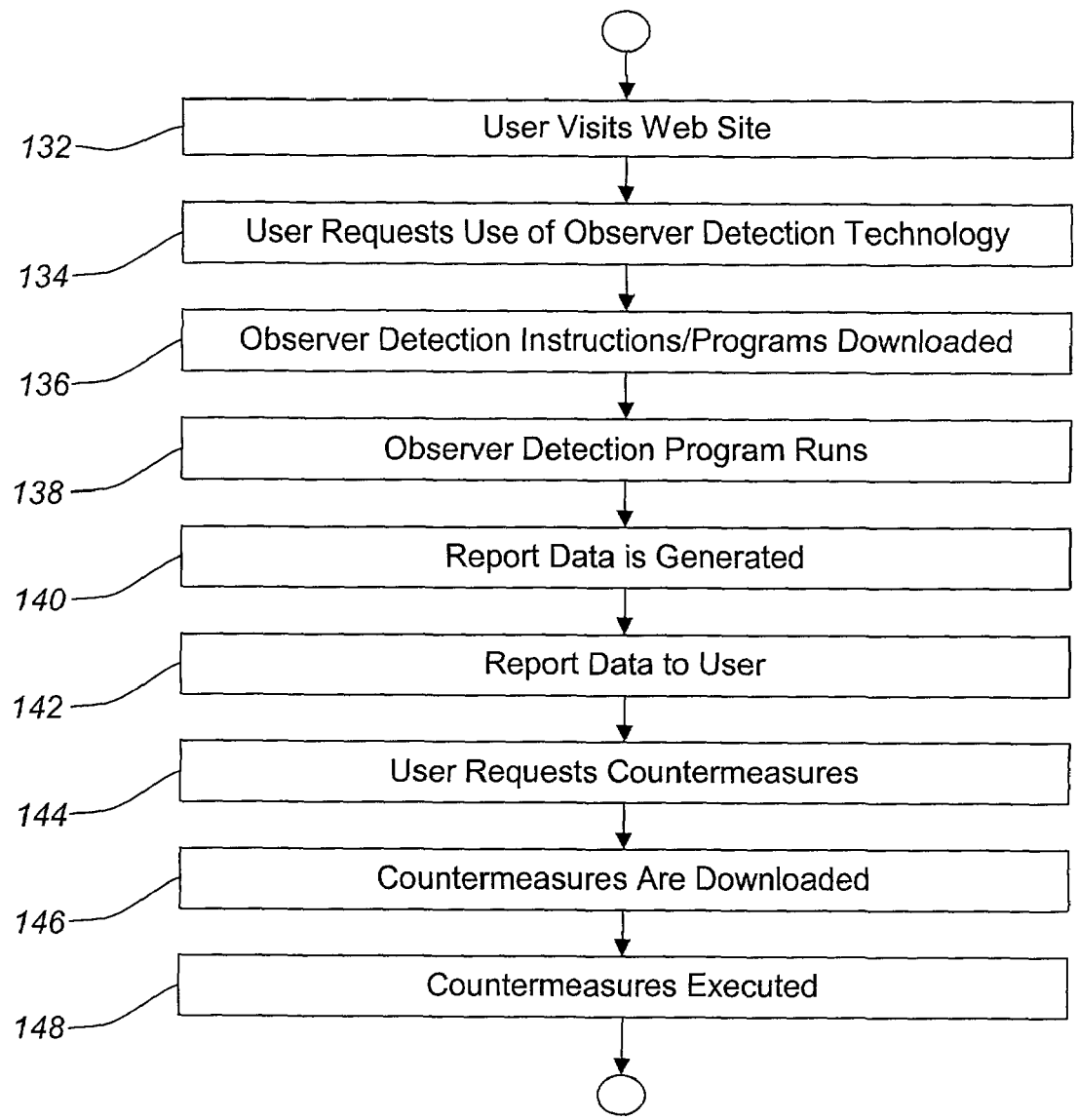
FIG. 9 is a general flow diagram illustrating the steps that may be followed with an embodiment distributed and used via the World Wide Web.

FIG. 9 is a general flow diagram illustrating the steps that may be followed with an embodiment distributed and used via the World Wide Web. A user may visit 132 the observer detection and/or countermeasures web site. A user may then make a request 134 from the web site for the detection of observer programs on the user's local system. Once this has been requested by the user, the embodiment of FIG. 9 downloads 136 a computer program implementing features of the embodiments herein. Once the observer detection software download is complete, it will run 138 as illustrated and described herein. The observer detection program may then generate 140 a report and present 142 the report to the user. The report may either be generated and displayed all locally, or it may use functionality of the web site for display. If the web site is to be used in presenting any report data, the observer detection computer program may send its report data back to the web site. The web site may then receive, store, format and then present such reporting data to the user.

If observer programs 34 were present on the system, the user may wish to use countermeasures against such observer programs 34. If a user desires to use countermeasures, he, she or it may make a request 144 from the web site for the use of countermeasures on the user's local system. Once this has been requested by the user, the embodiment of FIG. 9 downloads 146 a computer program implementing features of the embodiments herein. Once the countermeasures software download is complete, it will run 148 as illustrated and described herein. After the countermeasures are run, the user may be finished using the features of the embodiments shown and used in FIG. 9. Of course, other processing may be accomplished, should the user so desire.

As discussed in relation to FIG. 3, observer installation data 52 may be examined to determine whether an observer program is present. One example of observer installation data 52 is startup commands. Startup commands are any type of instruction or configuration that may cause certain programs, processes, tasks, modules, etc. to be started, whether at startup or some time later. Some startup commands, in certain operating systems, may be found in the registry. As discussed above, changes in the registry may be examined to determine if an observer program is present. The term registry startup command will be used to describe those items in the registry that cause certain programs, processes, tasks, modules, etc. to be started or loaded at startup. Typical folders in the registry for registry startup commands include, but are not limited to, HKEY_LOCAL_MACHINE\SOFTWARE\Microsoft\Windows\CurrentVersion\Run, HKEY_LOCAL_MACHINE\SOFTWARE\Microsoft\Windows\CurrentVersion\RunOnce, HKEY_LOCAL_MACHINE\SOFTWARE\Microsoft\Windows\CurrentVersion\RunService s, etc. Those skilled in the art will appreciate the various places in the registry where registry startup commands may be placed. The registry startup commands may be examined to determine whether an observer program is being started through use of a registry startup command, which indicates if an observer program may be present.

Some startup commands, in certain operating systems, may be found in other files besides the files associated with the registry. For example, startup commands may be found in .ini files, login scripts, the startup folder, initialization files, startup files, etc. The startup commands in these types of files may be examined to determine whether an observer program is being started through use of a startup command, which indicates if an observer program may be present. For example, under Windows NT/2000, there is a folder that indicates what kernel drivers are to be loaded at startup. This folder may be searched to determine whether an observer program is being started.

When Windows starts the Windows Explorer process is started. The Windows Explorer allows custom configuration with extensions. For example, context menu items may be added through the use of these Explorer extensions. An observer program may be installed and/or disguised as an Explorer extension. The Explorer extensions may be searched for observer program characteristics to determine whether the observer program is present.

As discussed in relation to FIG. 3, tasks/processes/modules may be searched to determine whether observer tasks/processes/modules are present. One example of this is relates to the fact that many observer programs open files and use files while running (e.g., to log keystrokes in, to save screenshots in, to save monitored data in, etc.). To determine whether an observer program is present, one may search through the open files and/or files in use and compare the characteristics of these files and/or the characteristics of the files that have these files open with observer program characteristics to determine whether an observer program is present.

Observer characteristics may include a number of things. For example, characteristics of files, processes, tasks, modules, etc., that may be used to identify observers may be, but are not limited to, file names, file sizes, file content, export tables, import tables, resources, what fifes the observer or parts of the observer depend from, what modules or processes the observer loads, what files the observer opens, what files the observer accesses, where the file is located, what files are located in the same directory as the observer program, etc.

One way to characterize an observer program and thereby be able to determine if an observer program is present is by examining the import/export tables of program modules. Modules may have an import table to indicate what functions are being imported and from what module the functions are being imported from. To detect whether an observer program is present, the import tables of modules may be examined. For example, if an observer program module imported function ABC from module XYZ, to detect whether this observer program module is present out of group of modules, each module of the group may be examined, specifically, the import tables of the modules may be examined to identify which functions are being imported from which modules. If the same functions are being imported from the same module, the module matches the observer program's characteristics. In this example, if a module imported function ABC from module XYZ, it would match a characteristic of the observer program. Each module of the group may be iterated through examining its imported functions to determine if a function ABC was being imported from module XYZ.

Modules may have an export table to indicate what functions are being exported from that module. To detect whether an observer program is present, the export tables of modules may be examined. For example, if an observer program module exported function ABC, to detect whether this observer program module is present out of group of modules, each module of the group may be examined, specifically, the export tables of the modules may be examined to identify which functions are being exported. If the same functions are being exported as those being exported from an observer program, the module matches the observer program's characteristics. In this example, if a module exported function ABC, it would match a characteristic of the observer program. Each module of the group may be iterated through examining its exported functions to determine if a function ABC was being exported.

An export table may have a name. If an export table of an observer program has a name, one may search for the export table name to detect whether an observer program is present.

Modules may have one or more resources. One may search the resources of modules and compare them with observer program resources to determine whether an observer program is present. There are a number of different kinds of resources. Examples of resources that may be searched include, but are not limited to, version information, strings, bitmaps, icons, dialogs, menus, etc. Other resources may also be searched. Custom resources may be used. For example, if an observer program used a custom resource, one may search for this custom resource to determine whether the observer program is present. The absence of resources may also be used to detect an observer program.

File or module content may be examined to determine if an observer program is present. For example, an observer program file or module may contain a particular string or strings that may be used to identify if a file or module is the observer program or relates to the observer program. Files or modules may be searched for a string or strings to determine whether an observer file or module is present. Observer programs, files or modules most often contain binary data. All or a portion of the data in the observer program, file or module may be used to search other programs, files or modules for a possible match to determine whether an observer program is present.

Some searches for data matches (string matches, binary data matches, etc.) may take a relatively long period of time to search. To speed the search for data matches, files or modules may be searched at specific offset addresses for the known data to determine whether an observer program was present. Additionally, files or modules may be searched starting at an offset address and spanning a certain length of bytes to determine whether an observer program is present. Thus, small changes in the observer program may not change the program enough to cause a failure of identification when using the exact offset address in combination with a span.

Some observer programs may use certain function calls. These function calls may be used to search on to identify whether any potential observers are present. Thus, if observer programs were known to functions such as "GetEvent", "GetKeystroke", "SetHook", etc., an observer program detector may search files or modules to see if they are using any of these functions. Those skilled in the art will appreciate the various operating system function calls that may be used to observe activity of a computer system. Such calls may be used to get certain events, get certain messages, get keystrokes, etc. Herein these functions will be referred to as OS observing functions. These various calls may be searched for to find any observer programs or any potential observer programs.

Figure 10:
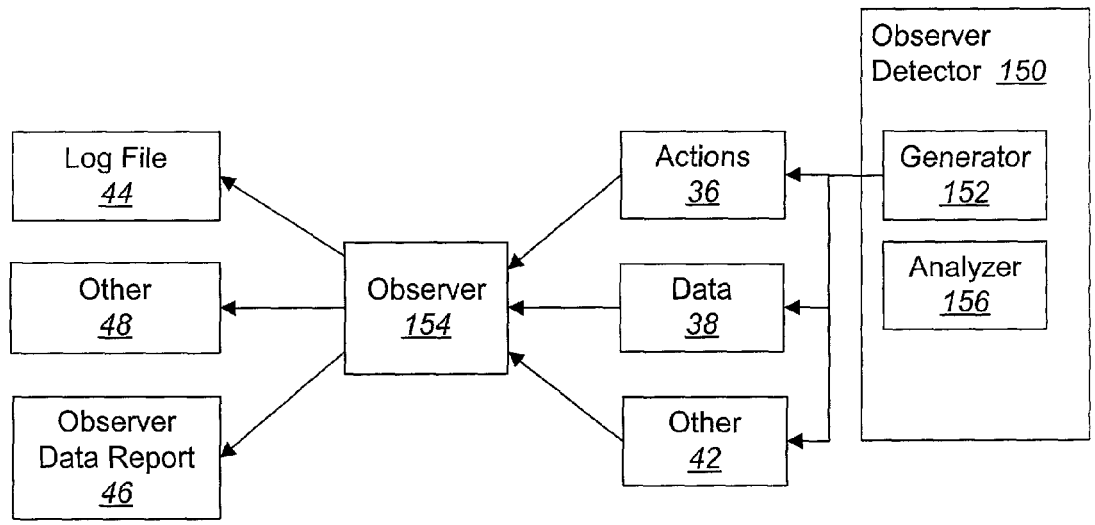
FIG. 10 illustrates a block diagram of another embodiment of an observer detector with a generator.

As discussed above, observer programs observe activity on a computer and typically save details of the activity in a log file, a report, etc. One may use the observer program's logging behavior to identify observer programs. In one embodiment, as shown in FIG. 10, an observer detector 150 may include a generator 152 to generate activity that may be logged or saved by an observer program 154. The observer detector 150 may then use an analyzer module 156 to watch or analyze the file system for any suspect behavior that corresponds to the generator's activity. There are many different types of activity that the generator 152 may generate to identify observer programs 154. For example, and as discussed earlier, many observer programs 154 log keystrokes. A number of these programs 154 save the logged keystrokes in a log file 44. This file 44 typically grows as the number of keystrokes grow. To locate and/or identify such keystroke log files 44, the observer detector 150 may use a generator 152 that is a keystroke generator. The keystroke generator may generate keystrokes. File activity may be examined during the keystroke generation. For example, one may examine file writes during a keystroke generation period to determine whether the keystrokes are being saved in a log file 44. A computer program may be used to generate keystrokes and act as a keystroke generator. In addition, Windows includes APIs to allow journaling that may be used to simulate keystrokes. Another example is that one may replace the keyboard handler (not shown) that may then generate keystrokes. It will be appreciated by those skilled in the art that there are a variety of ways to generate keystrokes.

The generator 152 may also generate other activities to help identify any observer programs 154. The generator 152 may generate window events, mouse events or movements, particular messages, etc. There are many different actions 36, data 38, activities, etc., that may be observed and logged by an observer program 154 to a log file 44, a report 46, or other 48 means to save the information. As a result, there are many different types of activities that the generator 152 may generate to help identify an observer program 154.

Figure 11:
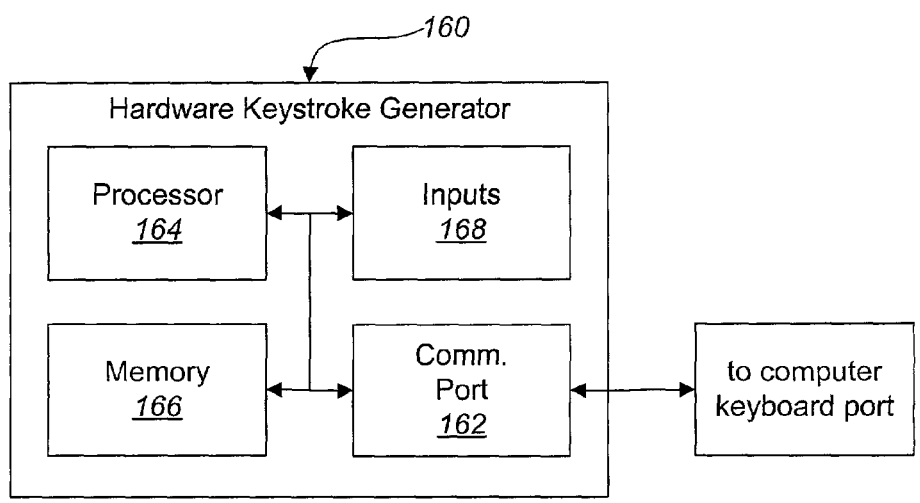
FIG. 11 illustrates a block diagram of an embodiment of a hardware keystroke generator.

FIG. 11 illustrates a block diagram of another embodiment of a generator 160 that may be used to detect observer programs 154. The embodiment of FIG. 11 illustrates a hardware keystroke generation embodiment 160. A hardware keystroke generator 160 may include a port 162 that plugs into a keyboard input port (not shown) on a computer. Thus, the hardware keystroke generator 160 may be connected to the keyboard input port and may then generate keystrokes. An observer program detector 150 may then analyze or watch file activity on the computer and search for the keystroke log file 44 growing with the keystrokes generated. A hardware keystroke generator 160 may include a processor 164, memory 166 and the communication port 162. The memory 166 contains the program or instructions to cause the keystroke generator 160 to generate keystroke codes and output them through the communications port 162 to simulate the codes output by a keyboard (not shown). Of course, the hardware generator 160 may also include inputs 168 that allow the generator 160 to be turned on or off, to enter various modes or speeds, for status information, etc.

The generator 160 may be configurable by a user to set the keystroke generation rate (i.e., the rate the keystroke codes are generated). The keystroke generation rate may be a flat rate or it may be a variable rate. Using a variable rate keystroke generator may be useful in case an observer 154 was programmed to detect keystrokes that may be automated rather than input by a user. The variable rate keystroke generator may be programmed by those skilled in the art with pauses, variable rates, typical user keystrokes (e.g., words from the dictionary, backspaces to correct mistakes, etc.), etc., to simulate real user input.

It is possible that a person wishing to monitor a computer's use may decide to use a hardware keylogger (not shown) rather than a computer program observer 34. If a hardware keylogger were used, it may be more difficult to determine if the hardware keylogger is present. Some hardware keyloggers are plugged in between the keyboard and the computer and save the keystrokes. Other hardware keyloggers may be placed inside of the computer housing and may also capture keystrokes. Typically these hardware keyloggers have limited memory. The hardware keystroke generator 160 may be used to generate keystrokes and fill any hardware keyloggers memory buffers such that after the buffers are full no more keystrokes will be captured by the hardware keylogger. In addition, a hardware keystroke generator 160 may be used to cause errors in a hardware keylogger by outputting too many keystrokes, or by outputting keystrokes in such a way as to cause a failure of the hardware keylogger (erroneous data, improper signaling, invalid formatting, higher than normal power levels, etc.).

A hardware keylogger may be configured so that when its' memory is full it begins to save new keystrokes over old data in memory. This type of configuration may cause the keylogger to continue to record keystrokes even when it is full. With this type of hardware keylogger, the hardware keystroke generator 160 may be used after a user types in keystrokes such that it fills the rest of the memory and continues to fill the memory such that the memory is overwritten that contained the user's keystrokes. Thus, as described, the hardware keystroke generator 160 may be used in a variety of ways to combat or counter an observer, whether or a computer program observer 34 or a hardware keylogger (not shown).

Figure 11B:
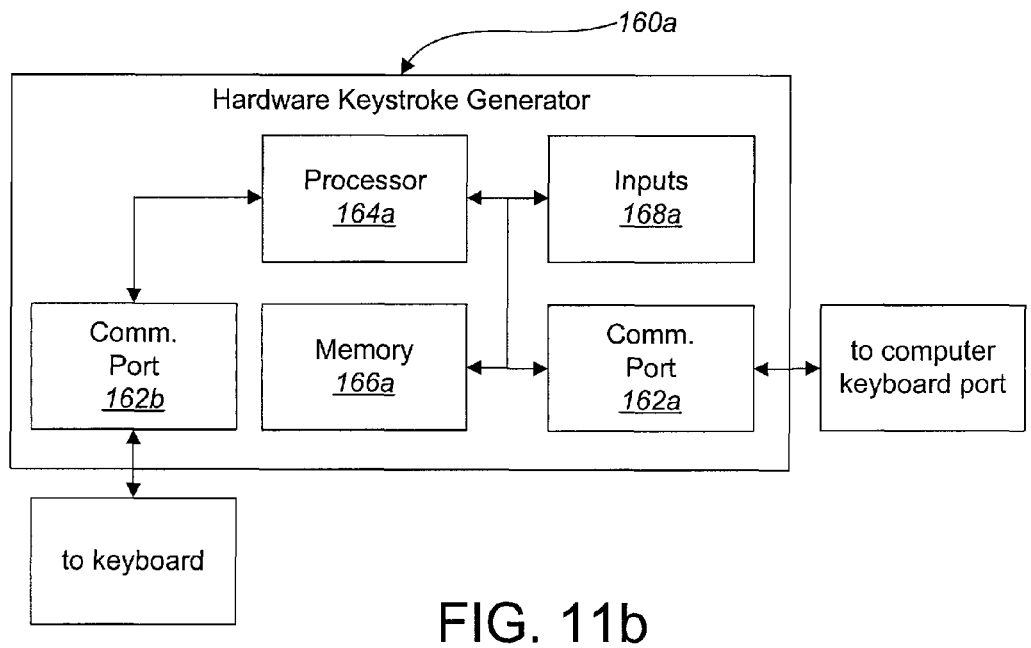
FIG. 11b illustrates a block diagram of another embodiment of a hardware keystroke generator.

The hardware keystroke generator 160 of FIG. 11 may be modified to remain connected to the computer and to be turned on and off, as needed. Such a modified hardware keystroke generator 160a is shown in FIG. 11b. The generator 11b operates similar to generator 160 with the additional communication port that allows a keyboard to be connected to the generator 160a. The generator 160a may be used in generator mode, as discussed above, or it may simply allow all characters to pass through without any modification. Thus, it may be connected between the keyboard and a computer and may remain in place and simply be turned on and turned off, as needed.

Figure 12:
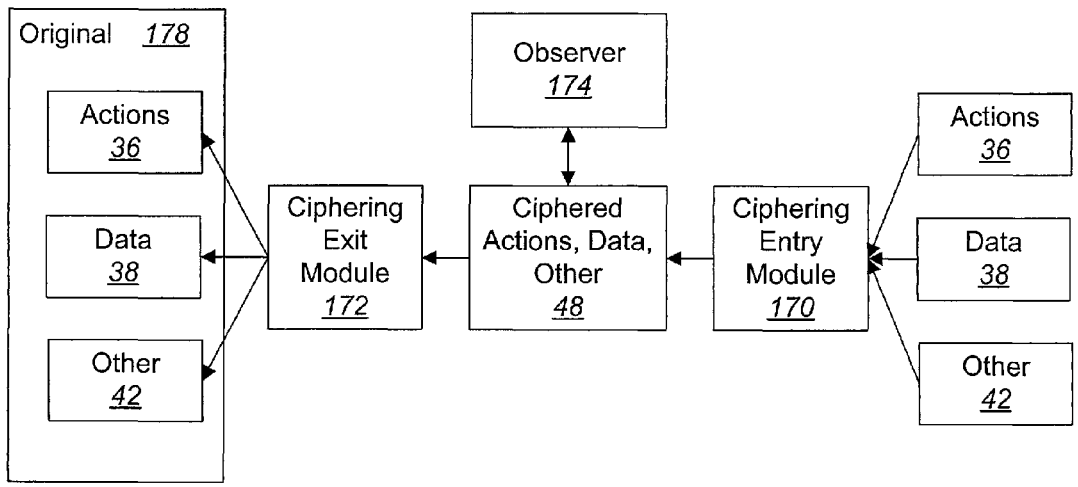
FIG. 12 illustrates a block diagram of an embodiment of a ciphering system.

FIG. 12 illustrates an embodiment of a system for ciphering, encrypting or otherwise altering actions 36, data 38 or other items 42 to defeat the operation of an observing entity, whether an observer 34 or a hardware keylogger. The system in FIG. 12 will be discussed in relation to countering a software observer 174, but those skilled in the art will appreciate how the system may be used to combat a hardware keylogger. A ciphering entry module 170 and a ciphering exit module 172 may be used to modify activities observed by an observing program 174 so that they are ciphered, encrypted or otherwise altered so that they are not the original activities. The ciphering entry module 170 and the ciphering exit module 172 are configured so that an observer 174 would be observing activities after the ciphering entry module 170 has altered them but before the ciphering exit module 172 has changed them back into their original states.

By way of example, a user may generate actions 36, data 38 or other items 42 at a computer. The ciphering entry module 170 operates to cipher, encrypt or otherwise alter the activities 36, 38, 42 to create ciphered activities 176. Those skilled in the art will appreciate the many ways in which items may be ciphered, encrypted or otherwise modified to change them from their original state to another disguised state. For example, a simple shifting of bits may be used to mix up the activities, a lookup table may be used to mix up the activities, or public-key encryption may be used to encrypt the activities, etc. Those skilled in the art will appreciate the many different levels and means to create ciphered or encrypted activities.

The observer 174 then observes the ciphered activities 176. Typically the observer 174 logs the activities 176. Because the activities were the ciphered activities 176, the observer does not have a record of the actual activities that took place. Finally, the ciphering exit module 172 changes the activities from their ciphered state 176 back to their original state 178.

A hardware and/or software component may be used to implement the ciphering entry module 170. If a hardware device were used to alter keystrokes, the hardware device may include similar components as the hardware keystroke generator 160. This hardware device may be configured to receive keystrokes and to encode, cipher, encrypt or otherwise obscure the keystrokes. The ciphering exit module 172 may be used to then decrypt the keystrokes.

The activities may be ciphered when needed. For example, the ciphering entry module 170 and ciphering exit module 172 may be turned on and turned off, as needed, thus entering a secure session when needed.

Figure 13:
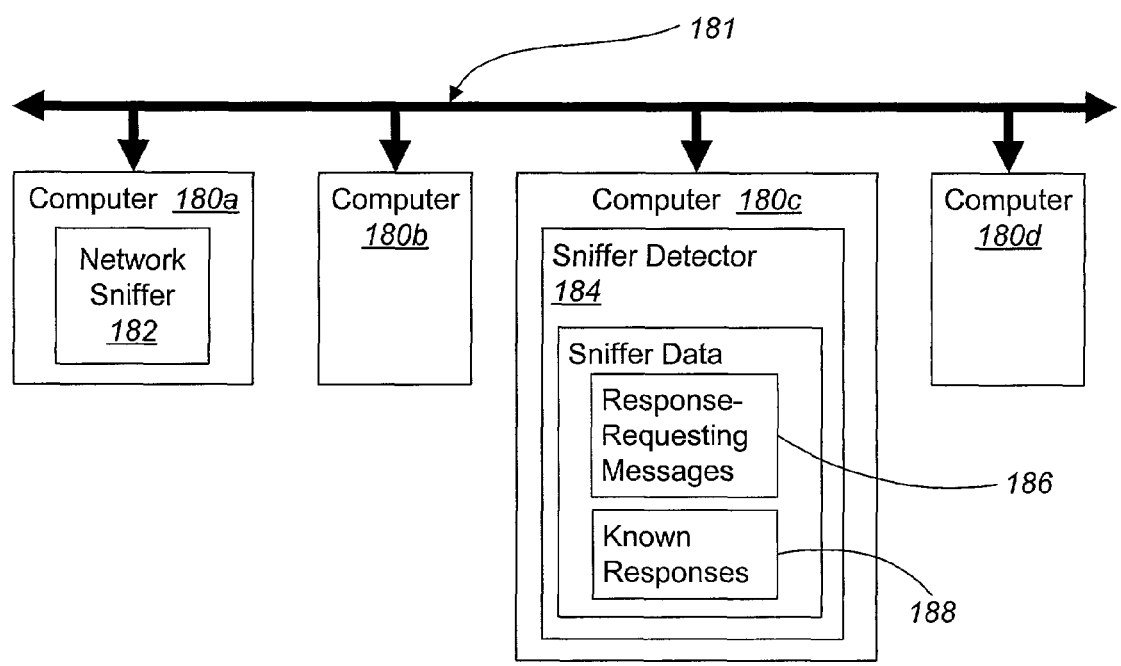
FIG. 13 illustrates a block diagram of an embodiment of a sniffer detector for detecting network sniffers.

Referring now to FIG. 13, a computer program for detecting network sniffers or network snoopers is disclosed. Some observer programs may be installed and running out on a network 181 (e.g., on a computer 180a on the network 181 and not on the local computer 180c) such that an observer program detector may not have direct access to it (i.e., the detector may not be running on the same computer as the network sniffer 182). FIG. 13 illustrates a plurality of computers 180a, 180b, 180c, etc. on a computer network. As shown, the network sniffer 182 monitors traffic on the network 181 as it is transmitted across the network 181.

A network sniffer detector 184 may be used to determine whether a network sniffer 182 is present. A network sniffer detector 184 may include a plurality of response-requesting messages 186 as well as a plurality of known responses 188 to the respose-requesting messages 186. The response-requesting messages are messages that are configured to request a response from the network sniffer 182. Those skilled in the art will appreciate, depending on what network sniffers 182 are to be detected, what response-requesting messages 186 may be used. One way to determine what response-requesting messages 186 may be used is to examine and run a network sniffer 182. Most network sniffers 182 provide some remote access capability. The messages used to identify and log into a network sniffer 182 may be used as response-requesting messages 186. Other messages that may cause a response from the network sniffer 182 may also be used.

The known responses 188 are responses that are expected from the network sniffers 182 to be detected. In operation, to detect whether a network sniffer 182 is present, the network sniffer detector 184 accesses a file containing the response-requesting messages 186 and begins sending out the messages 186 while listening for any responses. When a response is received by the detector 184, the detector 184 examines the response and compares the response with the known responses 188 to determine whether a network sniffer 182 is present.

Commands or requests may also be sent across a network 181 to any network sniffers 182 and any responses from sniffers 182 may be used by a sniffer detector 184 to determine that a network sniffer 182 was present.

From the above discussion, it will be appreciated that the present embodiments disclosed provide systems and methods for detecting the presence of an observing or monitoring program. In addition, systems and methods have been disclosed for providing countermeasures against observing or monitoring programs.

The present embodiments may be embodied in other specific forms without departing from their spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A computer program embodied in a non-transitory computer-readable medium for scanning a computer for observer programs, the computer program comprising:

observer data comprising a plurality of observer program characteristics descriptive of a plurality of observer programs where the observer programs are programmed to observe activities on a computer system and to create log data, and wherein the log data includes screen shots, program usage and web sites visited;

reading instructions that read memory of the computer to obtain memory data;

comparing instructions that compare the plurality of observer program characteristics with memory data characteristics to determine whether an observer program is present on the computer;

generating instructions that generate results from the comparing, wherein the results generated indicate whether the observer program is present on the computer;

countermeasure instructions that alter the operation of the observer program;

outputting instructions that provide the results through a graphical user interface and that prompt as to whether the countermeasure instructions should be executed, wherein the countermeasure instructions are executable to (1) temporarily disable the observer program, (2) permanently disable the observer program, and (3) create decoy observer created data but wherein the observer program continues running;

disabling instructions to disable the observer program if it is present on the computer, the disabling instructions implementing a method comprising:

entering a startup command to load a kill program before the observer program is started;

rebooting the computer;

starting the kill program by execution of the startup command; and deleting an observer program startup command so that the observer program is not started.

2. The computer program of claim 1 wherein the memory data includes startup commands.

3. The computer program of claim 1 wherein the memory data includes registry startup commands.

4. The computer program of claim 1 wherein the plurality of observer program characteristics includes observer import table data and wherein the comparing instructions compare memory import table data from the memory data characteristics with the observer import table data to determine whether an observer program is present on the computer.

5. The computer program of claim 1 wherein the plurality of observer program characteristics includes observer export table data and wherein the comparing instructions compare memory export table data from the memory data characteristics with the observer export table data to determine whether an observer program is present on the computer.

6. The computer program of claim 1 wherein the plurality of observer program characteristics includes observer resource data and wherein the comparing instructions compare memory resource data from the memory data characteristics with the observer resource data to determine whether an observer program is present on the computer.

7. The computer program of claim 1 wherein the plurality of observer program characteristics includes observer file content data and wherein the comparing instructions compare memory file content data from the memory data characteristics with the observer file content data to determine whether an observer program is present on the computer.

8. The computer program of claim 7 wherein the comparing instructions compare the observer file content data with the memory file content data at an offset address.

9. The computer program of claim 7 wherein the comparing instructions compare the observer file content data with a span of the memory file content identified by an offset address.

10. The computer program of claim 1 wherein the plurality of observer program characteristics includes observer module loading data and wherein the comparing instructions compare memory module loading data from the memory data characteristics with the observer module loading data to determine whether an observer program is present on the computer.

11. The computer program of claim 1 wherein the plurality of observer program characteristics includes OS observing functions and wherein the comparing instructions compare memory functions from the memory data characteristics with the OS observing functions to determine whether an observer program is present on the computer.

12. The computer program of claim 1 wherein the memory data includes explorer extension data.

13. The computer program of claim 1 wherein the memory data includes file use information.

14. The computer program of claim 1 wherein the memory data includes process information.

15. The computer program of claim 1 wherein the memory data includes running process information.

16. The computer program of claim 1 wherein the memory data includes loaded modules information.

17. The computer program of claim 1 wherein the memory data includes driver data.

18. The computer program of claim 1 wherein the memory data includes kernel driver data.

19. The computer program of claim 1 wherein the method further comprises deleting observer program files.

20. A method embodied in a non-transitory computer-readable medium for scanning a computer for observer programs, the method comprising:

using observer data comprising a plurality of observer program characteristics descriptive of a plurality of observer programs where the observer programs are programmed to observe activities on a computer system and to create log data, and wherein the log data includes screen shots, program usage and web sites visited;

reading memory of the computer to obtain memory data;

comparing the plurality of observer program characteristics with memory data characteristics to determine whether an observer program is present on the computer;

generating results from the comparing, wherein the results generated indicate whether the observer program is present on the computer;

outputting the results through a graphical user interface; and prompting the user as to whether countermeasure instructions should be executed, wherein the countermeasure instructions are executable to (1) temporarily disable the observer program, (2) permanently disable the observer program, and (3) create decoy observer created data but wherein the observer program continues running;

disabling instructions to disable the observer program if it is present on the computer, the disabling instructions implementing a method comprising:

entering a startup command to load a kill program before the observer program is started;

rebooting the computer;

starting the kill program by execution of the startup command; and deleting an observer program startup command so that the observer program is not started.

\* \* \* \* \*